(12) United States Patent
Shirochi et al.

(10) Patent No.: US 6,646,628 B2
(45) Date of Patent: Nov. 11, 2003

(54) LIQUID CRYSTAL PROJECTOR AND ADJUSTING METHOD THEREOF

(75) Inventors: Yoshiki Shirochi, Chiba (JP); Yuji Nagata, Tokyo (JP); Hiroaki Endo, Kanagawa (JP)

(73) Assignee: Sony Corporation, Tokyo (JP)

( * ) Notice: Subject to any disclaimer, the term of this patent is extended or adjusted under 35 U.S.C. 154(b) by 135 days.

(21) Appl. No.: 09/919,212

(22) Filed: Jul. 30, 2001

(65) Prior Publication Data

US 2002/0011984 A1 Jan. 31, 2002

(30) Foreign Application Priority Data

Jul. 31, 2000 (JP) .......................................... 2000-235252

(51) Int. Cl.$^7$ ............................. G09G 3/36; G09G 5/00; G09G 5/10
(52) U.S. Cl. ......................... 345/96; 345/89; 345/209; 345/214; 345/690
(58) Field of Search ........................... 345/89, 96, 209, 345/690, 212, 214; 353/31; 348/744

(56) References Cited

U.S. PATENT DOCUMENTS 6,217,174 B1 * 4/2001 Knox ........................... 353/31
6,366,271 B1 * 4/2002 Kohno et al. ................ 345/103
6,462,735 B2 * 10/2002 Naito .......................... 345/204

* cited by examiner

*Primary Examiner*—Richard Hjerpe
*Assistant Examiner*—Duc Q Dinh
(74) *Attorney, Agent, or Firm*—Frommer Lawrence & Haug LLP; William S. Frommer; Gordon Kessler (57) ABSTRACT

In active driving of liquid crystal panels (R, G, and B) corresponding to R, G, and B color by X shift registers (R, G, and B) and Y shift registers (R, G, and B), alternating-current driving is performed such that signals to be written to the R color and B color liquid crystal panels are opposite in polarity to a signal to be written to the G color liquid crystal panel and also Vcom voltage of each of the liquid crystal panels is adjusted to thereby reduce flicker. The Vcom voltage supplied to the B color liquid crystal panel, for example, is finely adjusted to reduce flicker of a synthetic image of the liquid crystal panels.

6 Claims, 7 Drawing Sheets

LIQUID CRYSTAL PROJECTOR AND ADJUSTING METHOD THEREOF

BACKGROUND OF THE INVENTION

The present invention relates to a liquid crystal projector apparatus capable of modulating light from a light source by means of a plurality of liquid crystal panels and projecting synthetic light transmitted or reflected by the liquid crystal panels as a color image, and particularly to a liquid crystal projector and an adjusting method thereof that prevent luminance variation from occurring in each frame on a display screen of such a liquid crystal display.

Television receivers and the like have been spread which form a liquid crystal projector with a light source such as a lamp and a plurality of liquid crystal panels or spatial light modulators to project a color image on a screen or the like.

Such a liquid crystal projector generally separates white light emitted from the lamp into three primary colors by means of a dichroic mirror, modulates light of each of the three primary colors by means of a liquid crystal panel, and thereafter combines the three pieces of light with each other by means of a dichroic prism or the like. Then the liquid crystal projector projects the combined light onto a screen or the like via a projection optical lens to thereby form a large screen.

Figure 5:
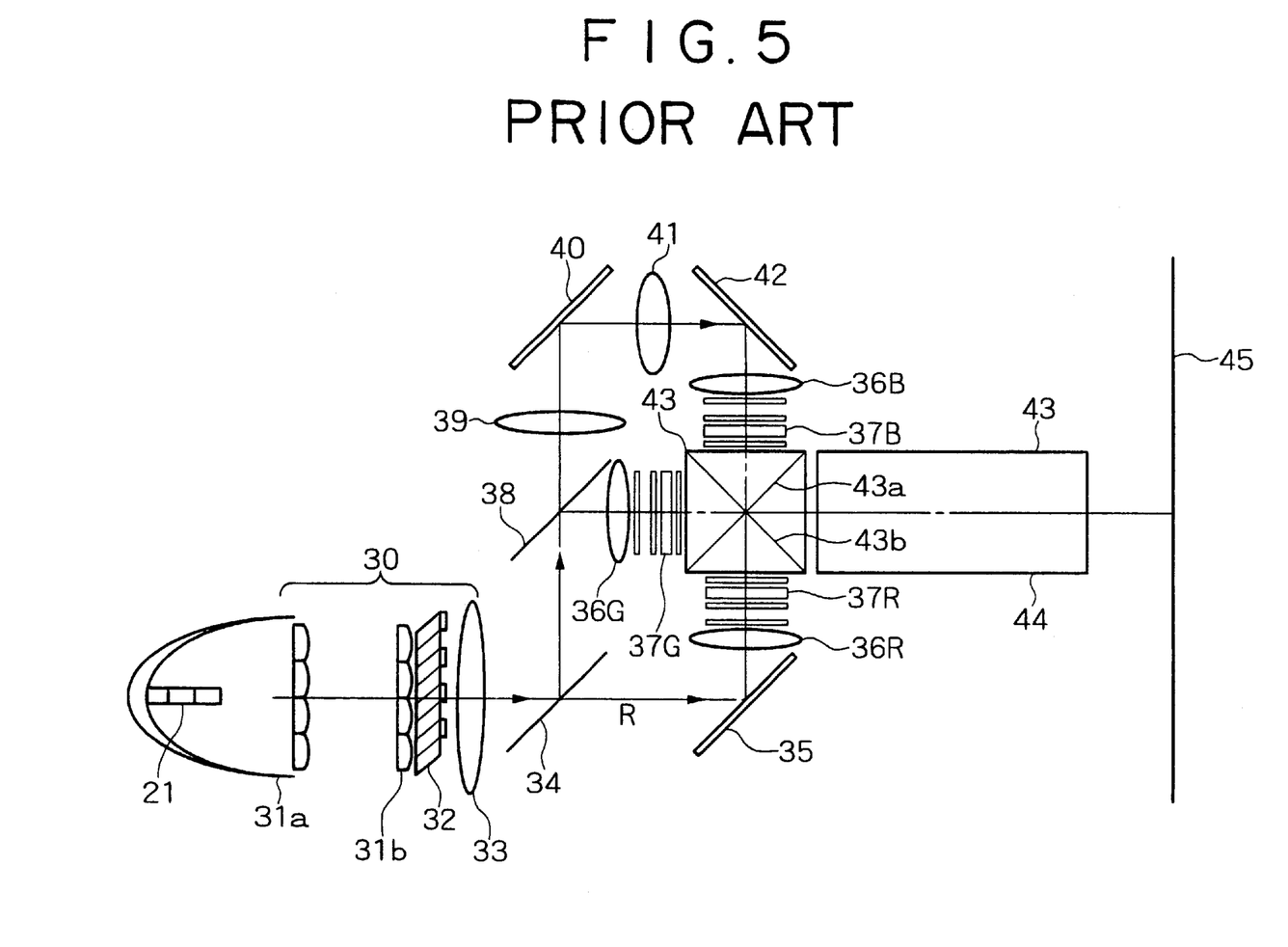
FIG. 5 is a plan view of a configuration of a conventional liquid crystal projector.

FIG. 5 is a plan view of a configuration of a three-panel-type liquid crystal projector apparatus formed with one liquid crystal panel for each of the R, G, and B colors (hereinafter referred to simply as a liquid crystal projector).

The liquid crystal projector apparatus shown in FIG. 5 condenses light emitted from a lamp 21 via an IR/UV cutoff filter in a light source optical system 30, and thereafter performs color separation.

The light source optical system 30 comprises two microlens arrays 31a and 31b each having a set of microlenses, a polarization beam splitter 32 for aligning a plane of polarization of light, and a condenser lens 33.

A white luminous flux that has passed through the light source optical system 30 first enters a dichroic mirror 34 for transmitting the red light R. Then, the dichroic mirror 34 transmits the red light R and reflects the green light G and the blue light B. The red light R transmitted by the dichroic mirror 34 is changed in traveling direction by 90°, for example, by a mirror 35, and then guided to a liquid crystal panel 37R via a field lens 36R.

In the meantime, the green light G and the blue light B reflected by the dichroic mirror 34 are separated by a dichroic mirror 38 for transmitting blue light.

Specifically, the green light G is reflected and thereby changed in traveling direction by 90°, for example, and then guided to a liquid crystal panel 37G via a field lens 36G. The blue light B passes through the dichroic mirror 38, thus traveling in a straight line, and then guided to a liquid crystal panel 37B via a relay lens 39, a mirror 40, a relay lens 41, a mirror 42, and a field lens 36B.

After being subjected to spatial light modulation by the liquid crystal panels 37R, 37G, and 37B, the pieces of light of the RGB colors enter crossed dichroic prisms 43 as a light combining means to be spatially combined with each other. Specifically, the red light R is reflected by a reflection plane 43a and the blue light B is reflected by a reflection plane 43b in a direction of a projection lens 44. The green light G passes through the reflection planes 43a and 43b, whereby the pieces of light of the three colors are combined with each other on a single optical axis.

Then, the projection lens 44 projects a magnified color image onto a screen 45 hung on a wall, for example, or a flat screen formed as a rear projector.

Figure 6:
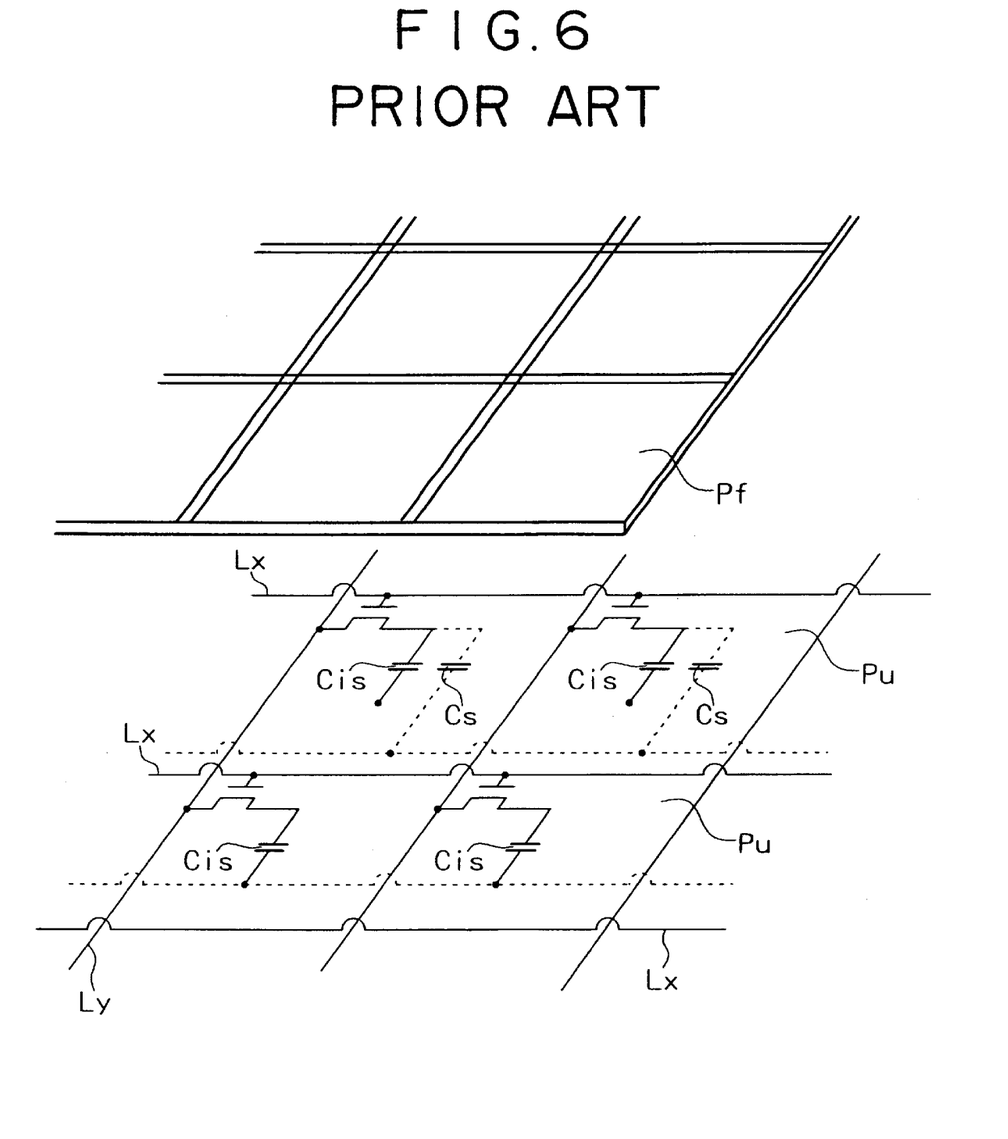
FIG. 6 is a diagram of assistance in explaining a conventional TFT type liquid crystal panel.

The R, G, and B liquid crystal panels 37 employed in the liquid crystal projector as described above generally have a transparent opposite electrode Pf and pixel electrode Pu with liquid crystal intermediate between the opposite electrode Pf and the pixel electrode Pu, as shown in FIG. 6. A thin-film transistor TFT serving as a switching device is formed by semiconductor techniques in part of the pixel electrode Pu in a divided pixel unit.

A gate of each thin-film transistor TFT is connected to a gate bus line Lx formed in a stripe manner in a line direction. A source of the thin-film transistor TFT is connected to a source bus line Ly arranged in a direction orthogonal to the gate bus line Lx.

A drain of each thin-film transistor TFT is connected to a transparent pixel electrode Pu divided for each pixel. A liquid crystal capacitance Cis is formed between an opposite electrode Pf and the pixel electrode Pu with liquid crystal intermediate between the opposite electrode Pf and the pixel electrode Pu.

Generally, the source bus lines Ly are sequentially selected in a horizontal direction by an X drive circuit to supply a display signal for one line, and the gate bus lines Lx are sequentially selected in a vertical direction, whereby a signal voltage for each pixel at an intersection of a source bus line Ly and a gate bus line Lx is supplied via a thin-film transistor to charge the liquid crystal capacitance Cis. Display information is thus written to modulate light passing through each liquid crystal pixel and thereby generate an image.

Incidentally, an auxiliary capacitance Cs as indicated by a dotted line is often formed for the purpose of compensating for leakage current between the source and the drain electrodes.

In some cases, black stripes are provided to the opposite electrodes Pf to minimize leak of light passing through portions other than the pixel electrode portions.

As described above, the liquid crystal panel (hereinafter referred to as the LCD panel) comprises an X shift register for sequentially selecting the source bus lines in a line direction to supply a video signal to be written; and a Y shift register for selecting the gate bus lines Lx to take in the supplied signal sequentially in a horizontal direction. Thus, active matrix driving is performed so that the video signal is written to each pixel in dot sequence or line sequence and the written signal is retained by a capacitance C (Cis+Cs) for a period of one field.

Figure 7:
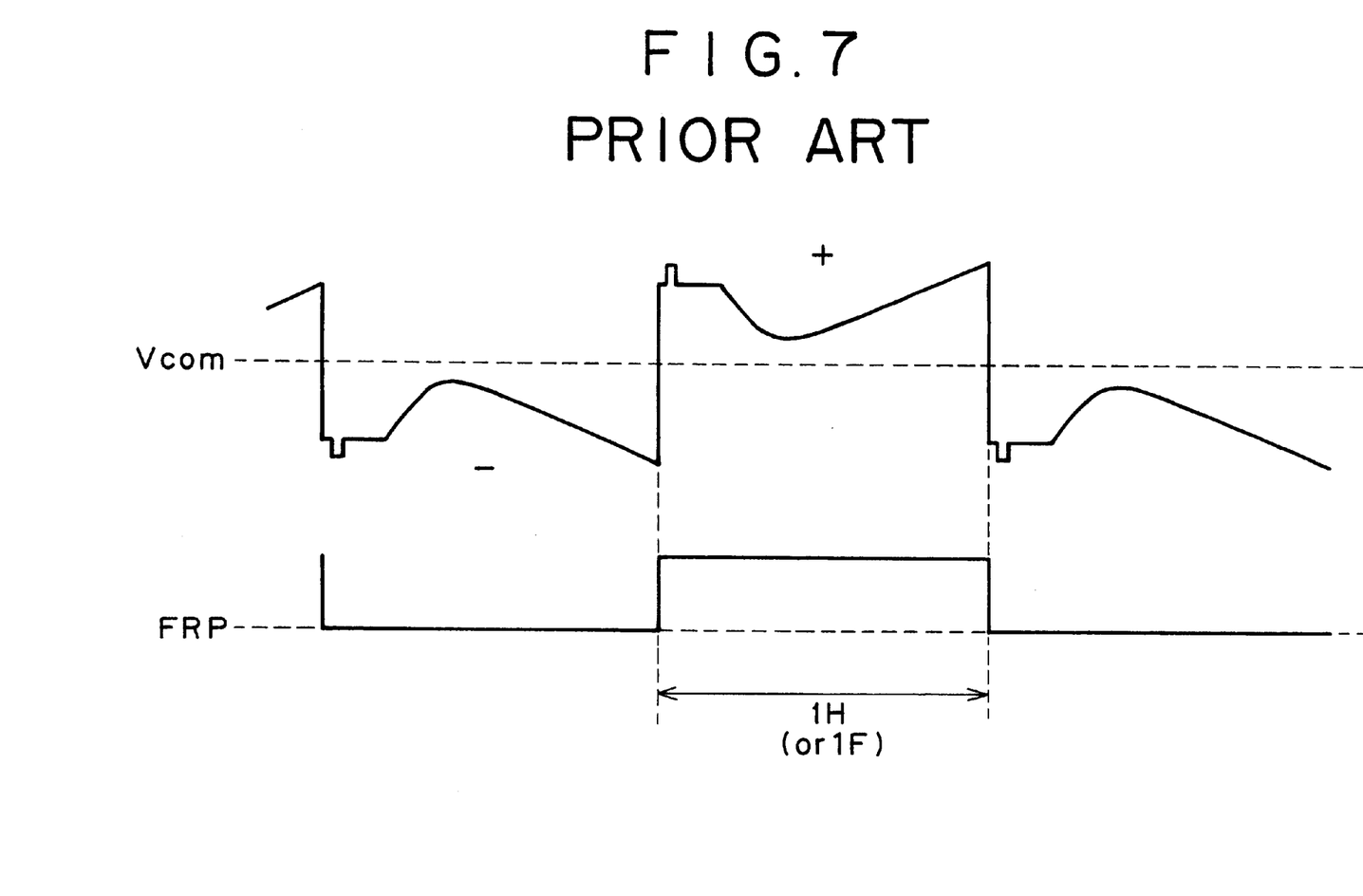
FIG. 7 is a waveform diagram showing a waveform of a signal to be written to a liquid crystal panel by a conventional alternating-current driving method.

The driving of each LCD panel by direct-current voltage tends to cause electrochemical reaction in liquid crystal material and alignment layer material and at their interface, which results in faulty display. Therefore, in order to prevent application of the DC voltage to each pixel electrode of the LCD panel, an image signal with a field cycle whose polarity is reversed between positive and negative with a Vcom voltage as its center DC level is supplied, as shown in FIG. 7.

Thus, the TFT type LCD panel employs a reversal driving method, in which the LCD panel is driven on the basis of an FRP signal for reversing signal polarity, and a display signal reversed in polarity at least in each field period is supplied to each pixel.

In the case of simple field reversal driving, it is difficult to perfectly balance the driving at the time of positive polarity and the driving at the time of negative polarity, and thus variation of transmitted light in each field generally results in a flicker occurring at half a frame frequency.

Hence, the signal to each LCD panel is reversed in each frame, and line-sequence reversal driving, which applies signals opposite to each other in polarity between adjacent lines, is performed to reduce variation of the luminance signal on each field screen.

Thus, when the Vcom voltage for setting the center direct-current level is set at an appropriate value for each LCD panel and line reversal for reversing polarity in each line is performed, luminance variation is reduced and thereby flicker is made less noticeable. However, when gray frames in which white and black are repeated in every two lines continue, a flicker or change in brightness in each scanning line still occurs because white is more noticeable than black.

Even in the case of dot reversal, which supplies a display signal reversed in polarity for each adjacent pixel in a horizontal direction, luminance variation remains, and therefore flicker is not reduced.

When each LCD panel is driven by an alternating-current signal that is reversed in polarity in each field or each line as described above, flicker should be reduced; however, when balance of reversed signals supplied to pixels is disturbed, luminance of the display screen is changed in each field, and thus the luminance variation is detected as flicker.

Therefore, the conventional reversal driving method adjusts the Vcom voltage shown in FIG. 7 for each LCD so as to minimize the luminance variation of a display image formed by combining images after light modulation by the LCDs with each other by means of a combining prism or the like.

However, it is difficult to completely eliminate the luminance variation in a field cycle or the luminance variation in each line as described above simply by precisely adjusting the Vcom voltage for each LCD panel and adjusting the balance of the writing signal waveform.

While various reasons are conceivable for this difficulty, there are structural problems including variation with each pixel in stray capacitance on a thin-film transistor, variation of gate electrode lines (for example odd-numbered lines and even-numbered lines are unbalanced), light leak caused by irradiating the TFT transistor with a high intensity light source, and various other factors.

Moreover, since the display screen of a recent liquid crystal projector in particular is increased in size, the detection limit of flicker is very high, and therefore flicker is strongly sensed by the human eye. The PAL system, in particular, has a low field frequency as compared with the NTSC system, and therefore makes flicker more noticeable.

Furthermore, with increasing intensity of the projection light source and hence increasing brightness of the screen, level of the detection limit of flicker is further raised, and therefore such a flicker as has been undetected on a conventional liquid crystal display screen has become a problem.

SUMMARY OF THE INVENTION

It is an object of the present invention to provide a liquid crystal projector that is highly effective when the level of the detection limit of flicker is high and an adjusting method for reducing screen variations, especially for a large-sized liquid crystal display apparatus.

In order to achieve the above object, according to a first aspect of the present invention, there is provided an adjusting method for a liquid crystal projector, the liquid crystal projector having a plurality of liquid crystal panels for forming a display frame by spatially combining pieces of light modulated by the liquid crystal panels with each other, the adjusting method comprising the steps of: driving each of the plurality of liquid crystal panels by an adjusting pattern signal whose polarity is reversed in each frame, and adjusting a direct-current level of the adjusting pattern signal to temporally average light projected by each of the liquid crystal panels; and thereafter adjusting a direct-current level of a driving signal of a part of the liquid crystal panels to temporally average luminance variation of a synthetic projection image modulated and spatially synthesized by the liquid crystal panels.

The liquid crystal panels can be arranged so as to transmit R color, G color, and B color, and the part of the liquid crystal panels is for the B color. The adjusting pattern signal can be a line-reversal alternating-current signal that is reversed in polarity in each horizontal line of the display screen or a dot-reversal alternating-current signal that is reversed in polarity in each pixel in a horizontal direction.

The driving signal of the G color liquid crystal panel can be formed such that the driving signal of the G color liquid crystal panel is opposite in polarity from driving signals applied to the B color and R color liquid crystal panels.

According to a second aspect of the present invention, there is provided a liquid crystal projector with a plurality of liquid crystal panels for forming a display frame by spatially combining pieces of light modulated by the liquid crystal panels with each other, the liquid crystal projector, including: a driving circuit for at least supplying each of the liquid crystal panels with a display signal whose polarity is alternately reversed in each line; and an adjusting means for adjusting a common voltage level of the display signal supplied to each of the liquid crystal panels by the driving circuit; wherein the common voltage levels of the plurality of liquid crystal panels except a part of the liquid crystal panels are adjusted so that luminance variation of light modulated in single-frame units by the liquid crystal panels is minimized; and only the common voltage level applied to the part of the liquid crystal panels is adjusted to a level such that luminance variation in a frame cycle of projection light synthesized by the plurality of liquid crystal panels is minimized.

The plurality of liquid crystal panels may be for R color, G color, and B color, and the part of the liquid crystal panels is for the B color or the R color, which is low in visibility.

Each of the LCD panels can be reversed in each frame, and driven by line reversal or dot reversal. Polarity of the display signal applied to the G color liquid crystal is opposite in phase to that of the signals applied to the R color and B color liquid crystals.

As described above, according to the present invention, the display apparatus using at least two or more LCD panels, supplying image signals by the reversal driving method, and forming a synthetic image adjusts luminance variation of each of the LCD panels during reversal driving to be minimized, and further adjusts luminance variation of light modulated by the LCD panels at a spatially different place. Therefore, the detection limit of flicker on a display screen can be made extremely low. It is thus possible to greatly contribute to reducing flicker especially on a large bright screen.

DETAILED DESCRIPTION OF THE INVENTION

Figure 1:
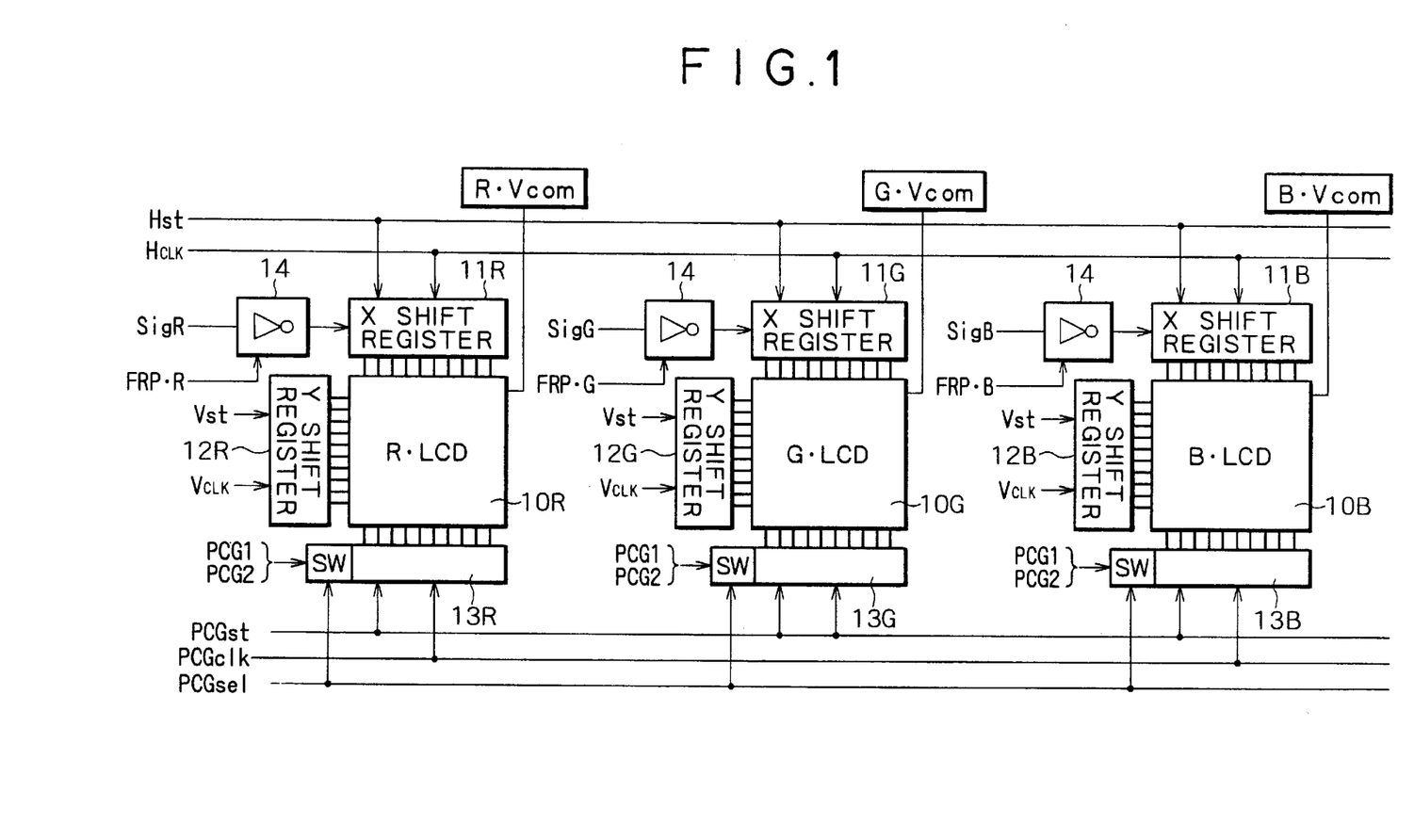
FIG. 1 is a diagram of assistance in explaining an overall configuration of a liquid crystal projector to which the present invention is applied.

FIG. 1 shows a principal part of an LCD panel driving circuit to which the present invention is applied.

In FIG. 1, references 10R, 10G, and 10B denote three LCD panels provided for color display. In general, the R, G, and B LCD panels are irradiated with red light (R), green light (G), and blue light (B), respectively, via an optical system as shown in FIG. 5, and are each driven by a color video signal. Then, for example, images modulated by the LCD panels 10 are spatially combined with each other and then projected on a screen or the like.

References 11R, 11G, and 11B denote X shift registers for supplying a signal for one horizontal line by sequential shifting. The X shift registers are driven by a horizontal clock signal Hclk with an Hst signal as a reference. A switch means for supplying a signal by selecting a data bus electrode connected to a drain electrode of a TFT transistor for writing the signal to a pixel in each horizontal line is provided in the case of dot sequence, for example.

References 12R, 12G, and 12B denote Y shift registers that start in response to a vertical synchronizing signal Vst and select a line by Vclk for selecting a horizontal line of the LCD panel. The Y shift registers apply voltage to matrix electrode lines, that is, gate electrodes generally formed in a horizontal direction from the top to the bottom of the panel.

References 13R, 13G, and 13B denote precharge shift registers (hereinafter referred to as PCG registers) for precharging with stray capacitance on a TFT transistor and its line. The registers supply precharge voltage to thereby reduce the time required to write signal voltage to each pixel.

Display signals SigR, SigG, and SigB are supplied to the R, G, and B LCD panels 10, respectively, via a reversing amplifier 14 for reversing their polarity to perform reversal driving as described above.

The reversing amplifier 14 is driven by a reversal driving signal FRP supplied from a control unit not shown in the figure such that the signal is reversed for each frame. Also, the reversing amplifier 14 can reverse the signal for each line or each adjacent dot.

A switch SW selects between signals PCG1 and PCG2 for different precharge voltages inputted to the PCG register 13 so as to correspond to the reversed signal, and the selected signal is distributed in a line direction by PCGclk.

The precharge signal is generally controlled such that a start signal PCGst and the clock signal PCGclk are supplied in timing in which precharging is performed 2 to 3 pixels before the signal being supplied to each pixel.

Figure 2:
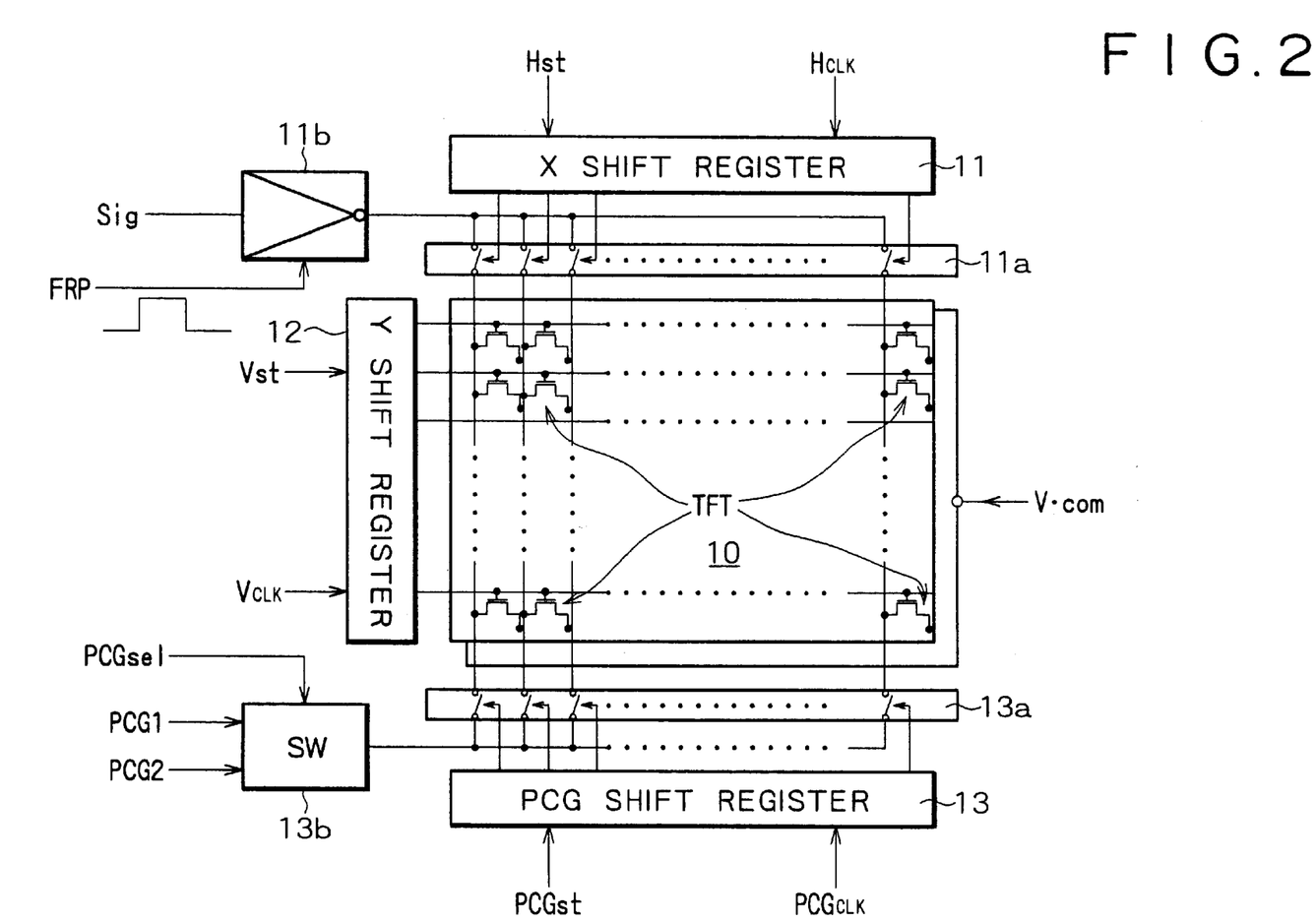
FIG. 2 is a block diagram of an LCD panel for writing a video signal according to the present invention.

FIG. 2 is a block diagram of a detailed mechanism of the LCD panel 10 in FIG. 1, and the same references as in FIG. 1 denote the same functional blocks.

Reference 11a denotes a switch group for a video signal reversed for each line via a reversing amplifier 11b, which switch group are sequentially closed in clock timing of the X shift register 11. For example, a pixel signal for display is supplied to each data bus line via an analog switch formed by a transfer gate.

Reference 12 denotes a Y shift register that starts in timing of the vertical synchronizing signal Vst and is formed by unit registers equal in number to that of horizontal lines. The Y shift register distributes a signal to turn on a gate electrode of a transistor TFT for each pixel in timing of $V_{CLK}$ for scanning the horizontal lines on a display plane.

The precharge voltage supplied via a switch 13b is supplied from a switch group 13a to data bus line electrodes in timing of the clock PCGclk of the PCG shift register 13.

A PCG select signal PCGsel selects between the precharge signals of different voltages so as to correspond to the polarity of the video signal to be written.

The other electrode plane of the liquid crystal panel formed by opposite electrodes is supplied with a common voltage Vcom, which corresponds to an average direct-current level of an alternating-current signal. The common voltage Vcom is adjusted for each LCD panel so as to be balanced with the alternating-current signal.

A video pattern of the Vcom voltage at the time of adjustment can be made for each LCD panel by a signal pattern formed by field reversal and line reversal and by a video pattern formed by line reversal and also dot line reversal, in which adjacent pixel signals are opposite to each other in polarity in a horizontal direction.

Figure 3:
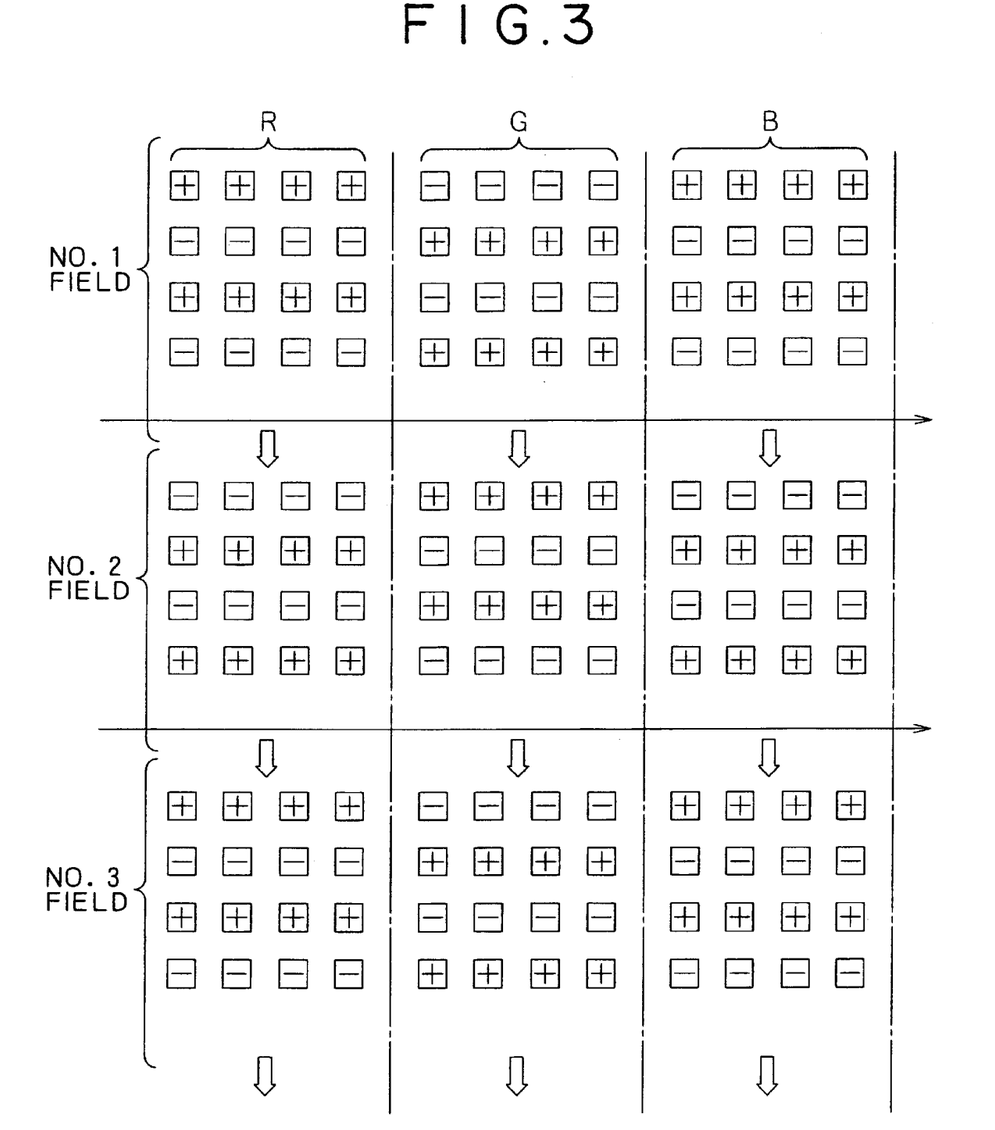
FIG. 3 is a pattern diagram of assistance in explaining polarity of alternating-current signals when the signals are inputted to three LCD panels.

FIG. 3 indicates polarity of each pixel signal in carrying out a line reversal driving method with +or −, and shows parts of the pixels of the R color, G color, and B color panels from the left.

FIG. 3 shows, in a vertical direction, that the signal polarity of each panel will be reversed in the next field.

As is understood from the signal polarity of the LCD panels, in the present invention, the G color panel, which has the greatest luminance variation in frame cycles, is driven in polarity opposite from the signal polarity of the other R color and B color panels.

Thus, in the present invention, when using three LCD panels, the R color and B color signals are controlled to be of opposite polarity from that of G color light, which governs about 60% of the brightness. Such a reversal method renders luminance variation in each field less noticeable in spatial terms.

In addition, the display screen adjusting method according to the present invention has a second adjusting operation for finely adjusting a common voltage Vcom•B for only the B color, for example, in addition to the operation of adjusting the common voltage Vcom of each of the LCD panels as described above.

Specifically, the common voltage vcom of each of the LCD panels is first roughly adjusted in such a manner that each of the LCD panels has least luminance variation in field cycles. Next, an image modulated and synthesized by the LCD panels (the image is preferably a white halftone, which makes flicker noticeable) is projected on a screen or the like to make the second adjustment.

The second adjustment is made on the LCD panel 10B that has minimized B color luminance variation in each field by reversal driving for only the B color, and therefore may consequently unbalance the common voltage Vcom•B of the B color.

However, by performing the second adjusting operation while monitoring a synthesized video signal on a liquid crystal projector, the adjustment can be made so that flicker, which is noticeable especially on a large bright screen and cannot be removed completely by a conventional Vcom adjusting operation, is further reduced to luminance variation below a detection limit.

Figure 4A:
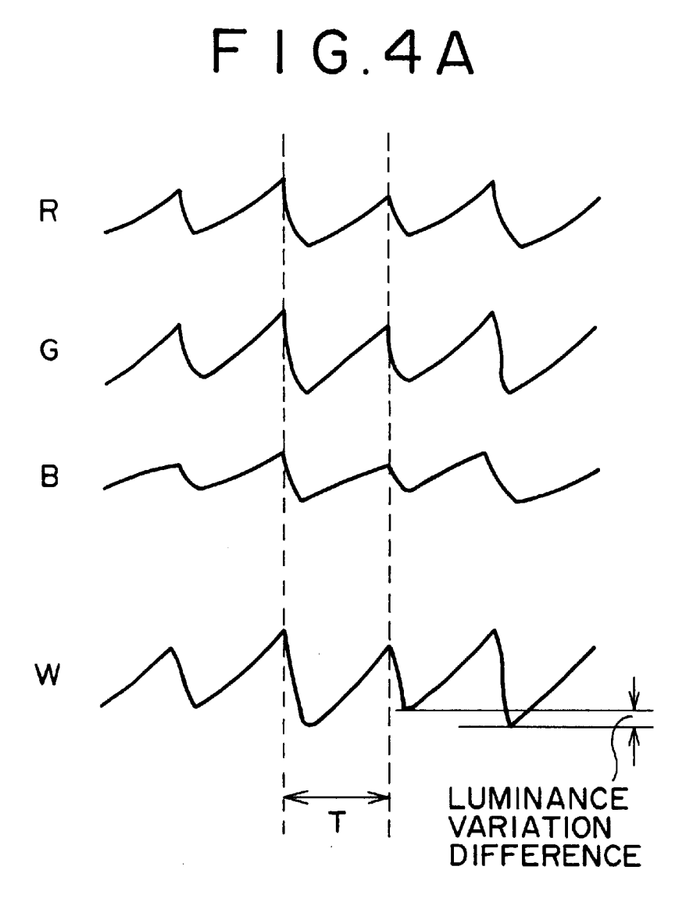
FIGS. 4A and 4B are waveform diagrams showing change in luminance of light transmitted by liquid crystal panel pixels of different colors in frame units.
Figure 4B:
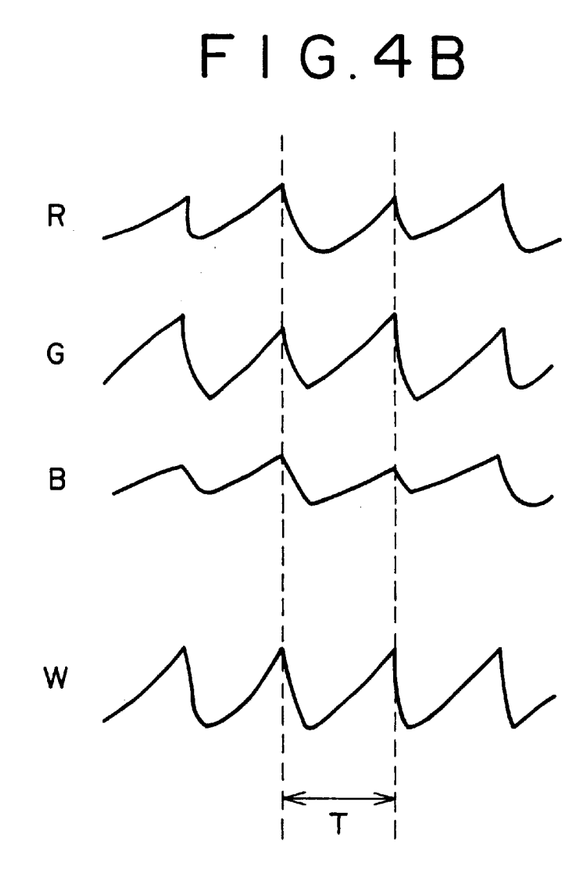

FIGS. 4A and 4B show waveforms obtained by measuring the luminance variation of the R, G, and B LCD panels driven by the above-mentioned reversal driving method on a time axis with a field cycle T.

Luminance change is observed in order of decreasing visibility, or order of G, R, and B, and their combined luminance change is shown as white light w.

The above luminance change of each color indicating light transmitted by the LCD panel of that color that processes a display signal and is changing in each field is made substantially small between fields by adjusting the common voltage Vcom of the LCD panel. FIG. 4A shows a case of in-phase reversal driving of the R, G, and B colors. The combined luminance variation is obtained by adding the luminance changes of the colors together. The luminance variation when a halftone gray signal, which makes flicker most noticeable, is supplied is still present in each field, and thus flicker is made noticeable.

In the present invention, as shown in FIG. 4B, only the G color is reversed in polarity such that the polarity of the G color is opposite to that of the other R color and B color signals.

Thus, polarity reversing control is effected such that an R color signal and a B color signal have a negative polarity when a G color signal for the same pixel has a positive polarity.

With the reversal driving method illustrated in FIG. 3, the luminance variations of the R color and the B color in a cycle (20 mS in the case of PAL) are cancelled out by the luminance variation of the G color in the same cycle. Thus, an improvement of about 10 dB in the variation of combined luminance W is shown as compared with FIG. 4A.

However, as the display screen is made larger and brighter, the conventional detection limit is raised further. Therefore, even with the reversal driving method of the LCD panel as illustrated in FIG. 3 or FIG. 4B, flicker is partly detected.

Thus, the present invention performs such reversal driving and then readjusts Vcom of the B color LCD panel on a white screen indicating the synthetic image. Adjustment is thus made on the white synthetic screen to further reduce the luminance variation in each field.

In this case, while the current LCD panels mostly have voltage values different from that of blue color Vcom that balances the luminance variation of the LCD panel of only the B color, flicker is further reduced on the magnified and projected synthetic image screen, and thus the flicker can be adjusted to be below the detection limit.

In addition, by making such adjustment by halftone gray, which makes flicker most easily detectable, the detection limit of flicker is further lowered and color balance is not disturbed.

In the above embodiment, the blue color Vcom adjustment is added as the second fine adjustment operation. This is based on the premise that the blue color has the lowest visibility and is the least noticeable as flicker (the detection limit of its luminance variation is low). However, the Vcom voltage adjustment as final adjustment operation is not limited to the B color; the Vcom voltage of the R color may be adjusted, or both the B color and the R color may be set as colors for adjustment. Since the G color has a very high visibility, however, the Vcom fine adjustment of the G color LCD panel is not desirable.

A pattern in which white and black are repeated in every two pixels is used for adjustment as a luminance variation adjusting pattern to eliminate a canceling effect of line reversal. In the embodiment of the present invention, an imbalance due to line reversal occurs, and therefore when adjustment is made by using a total white signal gray scale including the effect of line reversal so as to minimize luminance variation in a frame cycle, the luminance variation can be further reduced.

While the FRP signal for reversing signal polarity is generally outputted from a timing generator according to a vertical synchronizing signal and a horizontal synchronizing signal, the PCGsel signal for selecting between the precharge voltages PCG1 and PCG2 is outputted to the switch circuit in synchronized relation to the FRP signal to increase writing speed.

It is to be noted that while description of the above embodiment has been made by taking a normally white liquid crystal panel as an example of the LCD panel, techniques of the present invention are of course applicable to a liquid crystal projector that projects reflected light modulated on a liquid crystal plane.

In addition, even when more than three liquid crystal panels are used as a color display apparatus, it is possible to minimize the flicker detection limit by adjusting the Vcom voltage of a liquid crystal panel with the lowest visibility.

What is claimed is:

1. An adjusting method for a liquid crystal projector, said liquid crystal projector having a plurality of liquid crystal panels for forming a display frame by spatially combining pieces of light modulated by said plurality of liquid crystal panels with each other, said adjusting method comprising the steps of:

driving a pixel electrode of each of said liquid crystal panels by a R color signal, a G color signal and a B color signal, respectively, whose polarity is reversed in each frame;

driving an opposite electrode of each of said liquid crystal panels by a video pattern formed by line reversal and also dot line reversal to the G color liquid crystal panel opposite to the liquid crystal panel for B color and the liquid crystal panel for R color, respectively.

2. The adjusting method for a liquid crystal projector as claimed in claim 1, further comprising the step of:

adjusting a direct-current level of said video pattern signal of a B color liquid crystal panel so as to minimize a luminance variation of a synthetic image formed by spatially combining pieces of light modulated by said liquid crystal panels with each other.

3. The adjusting method for a liquid crystal projector as claimed in claim 1, further comprising the step of:

adjusting a direct-current level of said video pattern signal of a R color liquid crystal panel so as to minimize a luminance variation of a synthetic image formed by spatially combining pieces of light modulated by said liquid crystal panels with each other.

4. A liquid crystal projector with a plurality of liquid crystal panels for forming a display frame by spatially combining pieces of light modulated by said plurality of liquid crystal panels with each other, said liquid crystal projector comprising:

a driving circuit for driving a pixel electrode of each of said liquid crystal panels by a R color signal, a G color signal and a B color signal, respectively, whose polarity is reversed in each frame;

a driving circuit for driving an opposite electrode of each of said liquid crystal panels by a video pattern formed by line reversal and also dot line reversal to the C color liquid crystal panel opposite to the liquid crystal panel for B color and the liquid crystal panel for R color, respectively.

5. A liquid crystal projector as claimed in claim 4, further comprising:

an adjusting circuit for adjusting a direct-current level of said video pattern signal of a B color liquid crystal panel so as to minimize a luminance variation of a synthetic image formed by spatially combining pieces of light modulated by said liquid crystal panels with each other.

6. A liquid crystal projector as claimed in claim 4, wherein an adjusting circuit for adjusting a direct-current level of said video Pattern signal of a R color liquid crystal panel so as to minimize a luminance variation of a synthetic image formed by spatially combining pieces of light modulated by said liquid crystal panels with each other.

\* \* \* \* \*